Figure 1:
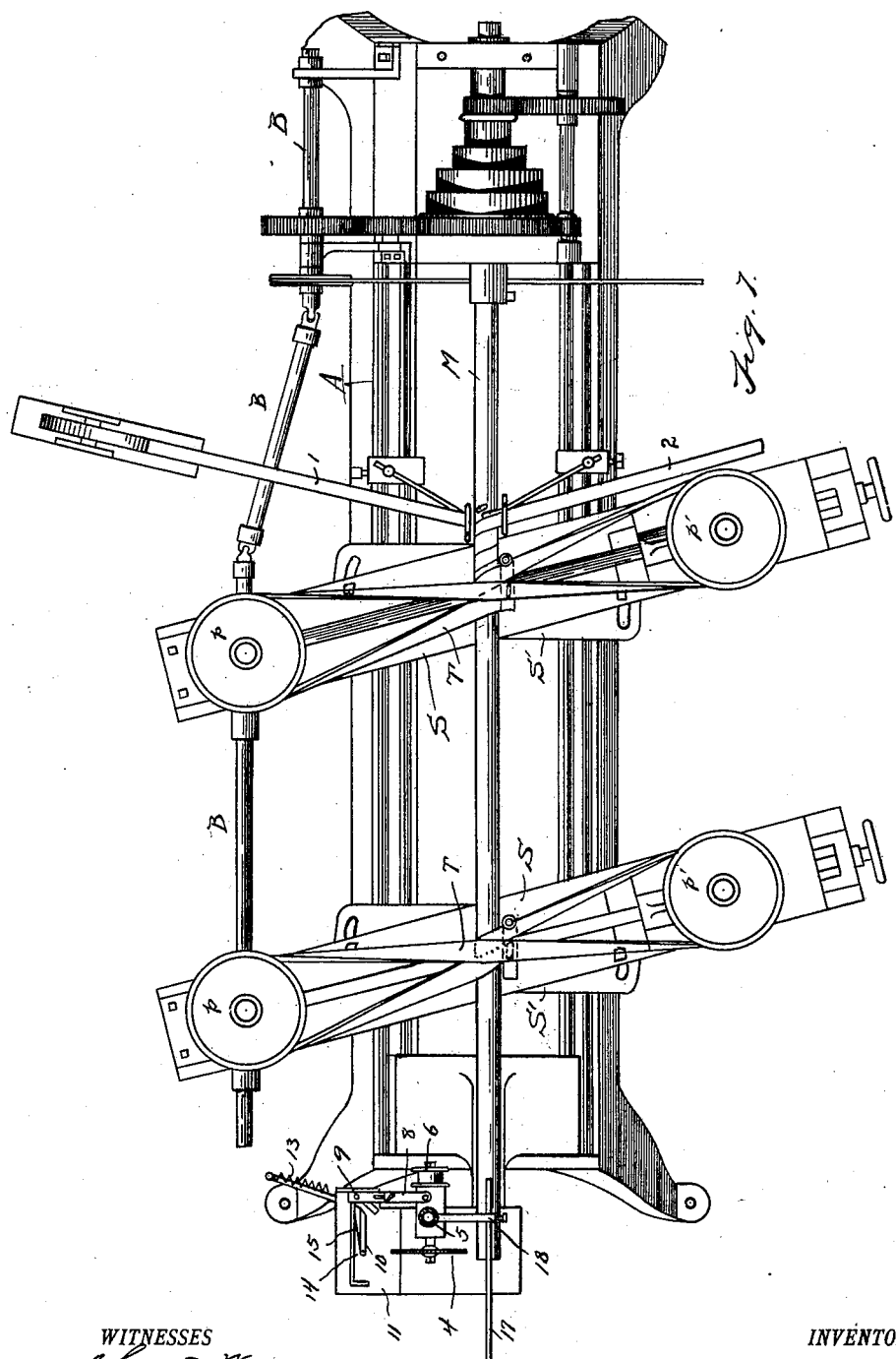

No. 712,954. Patented Nov. 4, 1902.
F. C. OSBORN.
TUBE MAKING MACHINE.
(Application filed May 24, 1902.)
(No Model.) 2 Sheets—Sheet 1.

WITNESSES
Chas E. Wiener
Thomas Henry

INVENTOR
Francis C. Osborn

No. 712,954. Patented Nov. 4, 1902.
F. C. OSBORN.
TUBE MAKING MACHINE.
(Application filed May 24, 1902.)
(No Model.) 2 Sheets—Sheet 2.
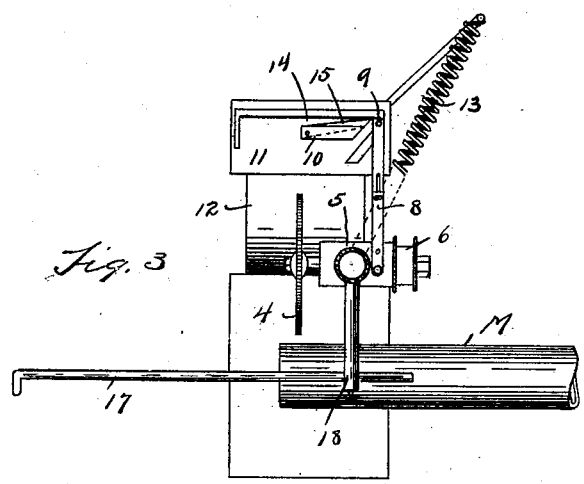
Fig. 3.
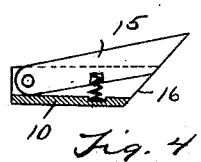
Fig. 4.
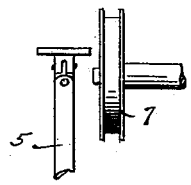
Fig. 2.
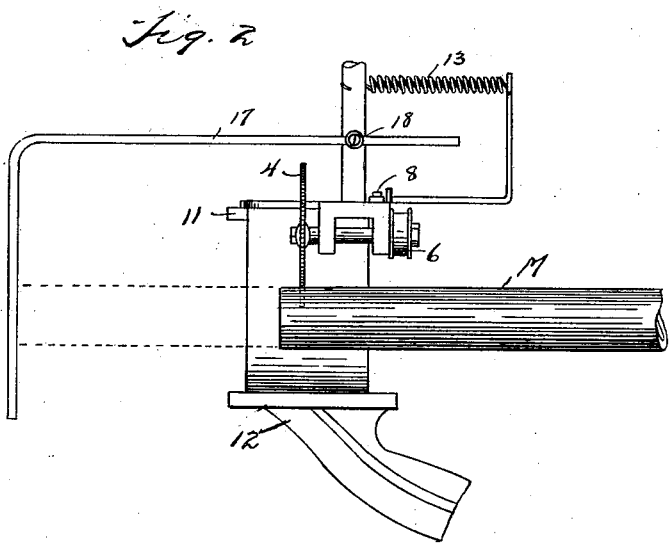
WITNESSES
Chas. E. Wiener
Thomas Henry
INVENTOR
Francis C. Osborn

UNITED STATES PATENT OFFICE.

FRANCIS C. OSBORN, OF DETROIT, MICHIGAN.

TUBE-MAKING MACHINE

SPECIFICATION forming part of Letters Patent No. 712,954, dated November 4, 1902.

Application filed May 24, 1902. Serial No. 108,784. (No model.)

*To all whom it may concern:*

Be it known that I, FRANCIS C. OSBORN, a citizen of the United States, residing in the city of Detroit, county of Wayne, and State of Michigan, have invented certain new and useful Improvements in Tube-Making Machines, of which the following is a specification.

This invention relates to improvements in machines for manufacturing continuous spirally-wound tubing of paper or other material, and more specifically to that class of machines in which the tubing is rotated and moved continuously forward toward the end of the mandrel. Such a machine is shown and described in my pending application, Serial No. 98,918, filed March 19, 1902, of which application the subject-matter of this application originally formed a part.

My improvements consist in an improved cutting-off mechanism and the attachment of same to machines of the class described.

In the drawings, Figure 1 is a plan view of a tube-forming machine, showing attachment of cutting-off mechanism. Fig. 2 is a side elevation of cutting-off mechanism. Fig. 3 is a top view of Fig. 2. Fig. 4 is a sectional plan of cam and detent.

A detail description of the mechanism and operation of the tube-forming machine to which my improvement is shown attached in Fig. 1 is given in my pending application above referred to, and it will therefore be sufficient here to briefly outline the movements by which the tubing is made to rotate and move continuously forward toward the end of the mandrel.

Upon a bed A, similar to a lathe-bed, is mounted a mandrel M, held in a fixed position by inserting one end in a socket of the headpiece of the bed. This mandrel is mounted centrally on the bed and sufficiently far above it to bring it into the horizontal plane of the belt-driving pulleys $p$ $p'$. The belt-driving pulleys $p$ $p'$ are keyed upon vertical stud-shafts and driven through bevel-gearing connecting with the main driving-shaft B. An endless belt T passes around the pulleys $p$ $p'$ and also encircles by a single turn the mandrel M. The pulleys $p$ $p'$ are so adjusted with reference to the mandrel that the belt T crosses the mandrel at an angle, and when the spiral strips of paper or other material 1 and 2, with their joining surfaces supplied with paste, are fed under the belt where it embraces the mandrel the strips will be carried around the mandrel and moved forward toward the free end of the mandrel and will form a continuous tube.

At the end of the mandrel from which the wound tubing issues is located my improved cutting-off apparatus, consisting of a saw 4, mounted in a bracket suspended from the ceiling. The suspending-rod 5 is jointed near its upper extremity in such a manner as to permit the saw to swing toward the mandrel and also in a direction longitudinally of the mandrel, but not permitting any twisting of the bracket. This joint may consist of an ordinary pivoted universal joint or of two pivoted joints, as shown in the drawings. The saw-arbor carries a grooved pulley 6, which is driven by belt connection with a driving-pulley 7, located adjacent to the suspending-rod and near the point where the rod is jointed, so that the belt swings in approximately the same arc as the suspending-rod. Attached to the frame carrying the saw and arbor is an adjustable arm 8, having a short stud 9 near its outer extremity. This stud is arranged to move in contact with a fixed cam 10, mounted on a bracket 11, fixed to the bed A through the arm 12. This cam is so fashioned that when the saw-frame is drawn in the direction in which the tube is moving endwise the saw is carried toward the tube into cutting contact therewith and held in cutting contact therewith during one revolution of the tube and is then permitted to swing away from the tube, being drawn therefrom by the spring 13. The spring 13, in addition to drawing the saw away from the tube, is so adjusted that it carries the saw and frame back to its initial position, the stud 9 guiding the saw-frame by passing back of the cam through a slotted passage 14 and over and beyond the end of a spring-operated detent 15, which prevents the passage of the stud back through the slotted passage, but compels it to follow the inclined forward edge of the cam 16 as it moves from its initial or normal position shown in the drawings, where it is held by the spring 13. The saw-blade is forced some distance into the tubing by the inclined surface of the cam.

The saw is carried forward longitudinally by the forward end of the moving tubing in contact with arm 17, which is adjustably fixed to the frame at 18. This arm is bent downward at its outer end, as is shown, and is so adjusted that the bent portion comes in contact with the outer end of the tube near the side opposite that on which the saw is located, so that after the saw has entered the tubing the end of the tubing is no longer in contact with the arm 17, for the bent portion of the arm 17 has passed beyond the farther edge of the tubing; but the saw is carried along with the tubing by its contact with the tubing at the cutting-point. By this arrangement it is found that the cut-off portion of the tubing drops away more readily than when in contact with the arm at the end of the operation.

What I claim is—

1. In a tube-forming machine, a saw-carrying arm, a saw mounted in one end of said arm and the other end of said arm bolted to fixed framework, a double joint in said arm near its fixed end permitting it to swing in two directions, and a fixed cam for guiding the movements of the swinging end of said arm, substantially as set forth.

2. In a tube-forming machine, a saw-carrying arm fast at one end to fixed framework, a saw mounted in the other end of said arm, a double joint in said arm near its fixed end, means for driving the saw, means for swinging the arm, and means for guiding the swinging movement of the arm, substantially as set forth.

3. In a cutting-off mechanism for tube-forming machines, a swinging saw-carrying arm attached at one end to a fixed bracket and having double pivotal connections therewith, a saw mounted in the free end of said arm, a cam arranged to guide the swinging movement of said arm, and suitable connection between the cam and arm, and means for moving the arm, substantially as set forth.

4. In a cutting-off mechanism for tube-forming machines, a saw mounted to move laterally toward and away from the tubing and longitudinally with the tubing, a cam for effecting the lateral movement toward the tubing, and an arm having fixed connection with the saw and moving therewith and also arranged to contact with the forward end of the tubing for effecting the longitudinal movement of the saw, said arm being so arranged as not to affect said longitudinal movement after the saw has fully entered the tubing, substantially as set forth.

In testimony whereof I have signed my name to this specification in the presence of two subscribing witnesses.

FRANCIS C. OSBORN.

Witnesses:
FLORENCE FOSTER,
E. N. BARTLET.